United States Patent [19]

Tuvesson et al.

[11] 4,050,703
[45] Sept. 27, 1977

[54] TUBULAR CONNECTORS

[75] Inventors: Pär-Åke Tuvesson, Bastad; Carl-Gustaf Johansson, Angelholm, both of Sweden

[73] Assignee: Lindab, Lindhs Industri AB, Bastad, Sweden

[21] Appl. No.: 637,037

[22] Filed: Dec. 2, 1975

[30] Foreign Application Priority Data

Dec. 12, 1974 Sweden .................................. 7415594

[51] Int. Cl.² ............................................. F16J 15/10
[52] U.S. Cl. ................................. 277/207 A; 285/231
[58] Field of Search ............... 285/111, 347, 345, 230, 285/231, 110; 277/DIG. 2, 157, 207 A

[56] References Cited

U.S. PATENT DOCUMENTS

| | | | |
|---|---|---|---|
| 3,118,681 | 1/1964 | Fuehrer | 277/157 |
| 3,201,150 | 8/1965 | Aydelott | 285/347 |
| 3,523,692 | 8/1970 | Otto | 277/96.1 |
| 3,829,107 | 8/1974 | Machado et al. | 277/DIG. 2 |

*Primary Examiner*—Robert I. Smith

*Attorney, Agent, or Firm*—Weingarten, Maxham & Schurgin

[57] ABSTRACT

A connector for establishing connection between pipes has an end portion of a maximum diameter which permits insertion of the connector in the pipe, and close to its end an anchoring portion of smaller diameter than the maximum diameter, an arched portion between the anchoring portion and the end, and a connecting portion which extends from the anchoring portion on the side thereof facing away from the pipe end obliquely upwardly to the maximum diameter of the connector. A lip seal of U-shaped cross-section is clamped about the anchoring portion to seal between the outer side of the connector and the inner side of the pipe. Upon insertion of the connector in the pipe the lip seal U-flange closest to the pipe end is bent over the U-web and the lip seal U-flange distant from the pipe end is bent over the connecting portion, while upon reversed relative movement of the connector the lip seal U-flange closest to the end is bent over the arched portion and the lip seal U-flange distant from the end is bent over the U-web.

3 Claims, 4 Drawing Figures

TUBULAR CONNECTORS

This invention relates to a tubular connector comprising at least one end portion of such a maximum diameter or corresponding dimension when of a cross-sectional shape other than circular that it is insertable in the end of a pipe for sealing connection therewith by means of a lip seal disposed between the outer side of the connector and the inner side of the pipe and anchored around the connector along a portion thereof having a smaller diameter than the maximum diameter of the connector and spaced from the end thereof.

Various types of connectors are previously known, in which sealing action is realised by means of a lip seal which is so dimensioned that, when connection is established, it is pressed against the inner or outer side of the pipe with which connection is to be established. The main principle is that on being actuated to a certain degree the lip seal can be pressed down into the groove in which the anchoring portion of the seal is placed, either on top of the anchoring portion or into an extension of the groove. Using a lip seal against an inner pipe surface, i.e. with a connector which is inserted into the pipe with which connection is to be established, certain drawbacks arise because the lip seal is inclined into a nearly axial position relative to the inner pipe surface. As a result of this position the lip seal will be placed under a considerable friction engagement with the inner side of the pipe when it is tried, for adjustment or exchange of the connector, to withdraw the connector from the pipe, since the lip seal cannot flip over but will jam against the inner side of the pipe. Because of the direction in which the connector is inserted in the pipe the lip seal will furthermore be wrongly positioned with regard to the pressure in the pipe, i.e. directed in the same sense as the pressure so that a pressure increase tends to reduce the established sealing action.

One object of this invention is to overcome these two drawbacks and to provide an easily adjustable connection between the connector and the pipe and to make it possible to turn the lip seal into correct position so that it is directed against the pressure, thereby resulting in an increased sealing action as the pressure increases in the pipe.

To this end, the lip seal is of U-shaped cross-section with the U-web tightly applied to the anchoring portion and with the U-flanges protruding approximately radially and extending above the level of the circumference of the connecting piece end portion of maximum diameter, and a bead or arched portion is arranged in immediate proximity of the anchoring portion on the side thereof facing the end of the connector, while a connecting portion is arranged on the side of the anchoring portion facing away from the end of the connector, said bead or arched portion having an outer diameter larger than that of the anchoring portion but smaller than the maximum diameter of the connector end portion, and the connecting portion extends from the anchoring portion up to the maximum diameter end portion and has a length greater than the height of the U-flanges so that when the connector is passed into the pipe end the outer U-flange will be bent over the U-web and the inner U-flange will be bent over the connecting portion and, upon reversed relative movement between the connector and the pipe, the outer U-flange will be bent over the bead and the inner U-flange will be bent over the U-web.

With the use of a lip seal of U-shaped cross-section or a double lip seal, the lips can be given smaller dimensions that what has been possible hitherto, while providing a still better sealing effect. By reason of the above-defined dimensions of the areas adjacent to the anchoring portion of the seal, the sealing lips are readily brought to face in the correct direction and the pipe and the connectors are also readily adjustable relative to one another. Furthermore, the double sealing lips will reduce the possibility of the seal being destroyed by screws screwed at such ponts into the pipe wall that the sealing lip is damaged, which rather frequently happens when but one sealing lip is provided.

An embodiment of the invention will be more fully described hereinbelow with reference to the accompanying drawings in which.

Figure 1:
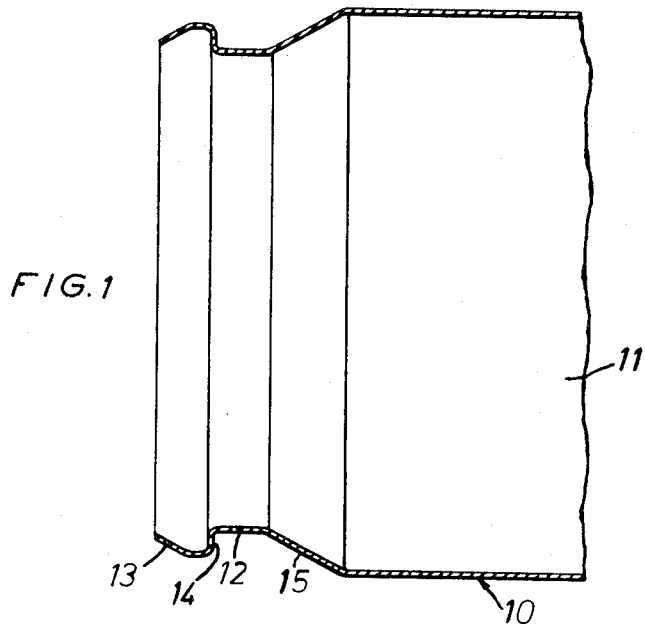
FIG. 1 shows a section of the end of a tubular connector.
Figure 2:
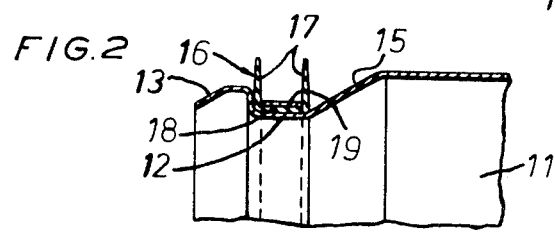
FIG. 2 shows a portion of the end of the connector with the seal passed thereonto.

The connector according to the invention may be given many different constructions, and for instance be in the shape of a pipe bend, a T-pipe, a straight pipe etc., which at one end and preferably at all ends is in the shape illustrated in FIG. 1 for the interconnection of pipe lengths. The connector according to the invention is primarily intended for the interconnection of ventilation pipes but must nowise be considered as restricted to this field. The drawing also illustrates a connector of circular cross-section intended for pipes of the same cross-section, but it will be readily understood that the invention is quite as well applicable to connectors and pipes, respectively, of other cross-sectional shapes, such as rectangular, oval etc.

The connector 10 according to the invention has a cylindrical portion 11 of a diameter approximately corresponding to the inner diameter of a pipe with which connection is to be established. In other words, the connector 10 is intended to be passed into the pipe to be coupled. A likewise cylindrical portion 12 of smaller diameter than the portion 11 is arranged adjacent the end of the connector. The part 13 of the connector located between the connector 10 and the cylindrical portion 12 is bent to form a bead 13 having a portion located in immediate proximity of the cylindrical portion 12 and extending radially 14, i.e. approximately at right angles to said cylindrical portion 12. As will be apparent from the drawings, the outer diameter of the bead 13 is greater than that of the cylindrical portion 12 but smaller than the diameter of the cylindrical portion 11. A frustoconical connection portion 15 is arranged between the cylindrical portions 11 and 12.

The cylindrical portion 12 is intended to form an anchorage for a lip seal 16 of U-shaped cross-section comprising a web 18 and flanges 17 which taper towards their free ends. The lip seal 16 is clamped to the anchoring portion 12 by means of a tightening strap 19, preferably of metal, which is placed on the inner side of the web and is of a width corresponding to the distance between the inner side of the flanges 17. On its side facing the web the strap 19 preferably has studs or projections to prevent that the seal 16 is shifted out of position. By making this strap 19 broader or narrower than the distance between the inner sides of the flanges 17, the latter can naturally be caused to incline towards and away from each other, respectively, if this is desired. The height of the flanges 17 is greater than the difference between the radii of the anchoring portion 12 and the cylindrical portion 11, for which reason the flanges 17 protrude beyond the level of the circumference of the portion 11.

Figure 3:
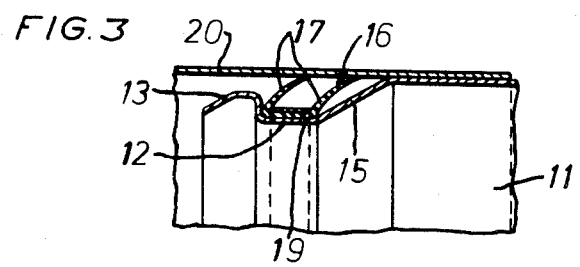
FIGS. 3 and 4 illustrate the insertion of the connector in a pipe with which connection is to be established.
Figure 4:
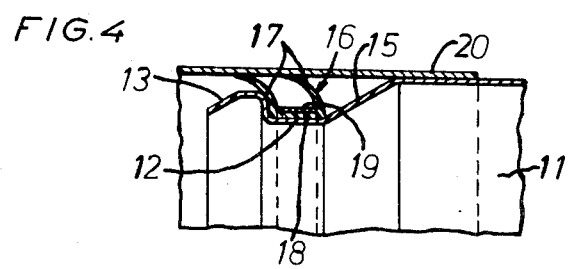

FIG. 3 shows how the connector 10 is inserted in a pipe 20 with which connection is to be established and the inner diameter of which approximately corresponds to the diameter of the cylindrical portion 11 of the connector 10. The flanges 17 of the lip seal 16 which radially protrude beyond the circumference of the portion 11 are bent in the manner illustrated in FIG. 3 when the connector is inserted in the pipe 20, i.e. the flange closest to the end of the connector is bent over the web 18 of the lip seal 16 while the flange 17 distant from the end of the connector is bent over the connecting portion 15 which is of greater length than the flange 17. After the connector 10 has been inserted a predetermined distance, for instance that shown in FIG. 3, the connector is again withdrawn and at said withdrawal the end portions of the lip seal flanges 17 frictionally engaging the inner side of the pipe 20 permit being reversed to the position shown in FIG. 4 since the requisite space is available for such reversal. In this manner the flanges 17 can be brought to take the correct position with regard to the pressure prevailing in the pipe 20, i.e. at increasing pressure the sealing effect will increase, as will be realized by a study of FIG. 4, and in connection with the operation described the position of the connector relative to the pipe 20 can also be adjusted. If it is desired for some reason or other to withdraw the connector 10 from the pipe 20 this can be done without too much trouble.

Considerable advantages in joining pipes are thus gained in a simple manner by constructing the end portion of the connector and the lip seal in conformity with the invention. It should be observed that apart from the above described function the bead 13 will also rigidify the end of the connector in a favourable manner.

What I claim and desire to secure by Letters Patent is:

1. A connector for joining to a hollow conduit, said connector comprising:

at least one end portion having an outer maximum dimension less than the inner dimension of said conduit to permit insertion into said conduit;

an anchoring portion of smaller dimension than said maximum dimension and spaced from the end of said connector;

an arched portion adjacent said anchoring portion on the side thereof facing the end of said connector, said arched portion being of greater dimension than said anchoring portion and of lesser dimension than said maximum dimension;

a connecting portion interconnecting and extending obliquely between said anchoring portion and said end portion; and a lip seal mounted about the circumference of said anchoring portion and adapted to establish a seal between the outer side of said connector and the inner side of said conduit, said lip seal having a U-shaped cross section, the web of said U-shaped seal being held against said anchoring portion, the flanges of said U-shaped seal extending substantially parallel and radially outwardly from said anchoring portion beyond the maximum dimension of said connector;

said connecting portion having a length greater than the height of said flanges of said U-shaped seal whereby upon axial insertion into said conduit, the flange closer to the end of said connector is bent over said web and the flange more distant from the end of said connector is bent over said connecting portion, and upon reversing the direction of relative movement between said connector and said conduit, the flange closer to the end of said connector is bent over said arched portion and the flange more distant from the end of said connector is bent over said web, said flanges remaining substantially parallel upon insertion, whereby an increase in pressure within said conduit makes more positive the seal between said connector and said conduit.

2. A connector as claimed in claim 1, including an endless strap, said strap being adapted to urge the web of the U-shaped lip seal tightly against said anchoring portion and having a width corresponding to the distance between the U-flanges.

3. A connector as claimed in claim 1, in which said arched portion located in immediate proximity of said anchoring portion has a radial portion which makes a right angle with said anchoring portion.

* * * * *